United States Patent [19]
Campbell et al.

[11] Patent Number: 5,380,796
[45] Date of Patent: Jan. 10, 1995

[54] FUNCTIONALIZED OLEFIN POLYMERS AND POLYPHENYLENE ETHER COMPOSITIONS CONTAINING THEM

[75] Inventors: John R. Campbell, Clifton Park; James R. Presley, Cobleskill, both of N.Y.

[73] Assignee: General Electric Company, Schenectady, N.Y.

[21] Appl. No.: 183,709

[22] Filed: Jan. 21, 1994

[51] Int. Cl.6 .................... C08F 255/02; C08L 71/12
[52] U.S. Cl. ......................... 525/68; 525/69; 525/132; 525/293; 525/302; 525/328.2
[58] Field of Search ............... 525/68, 69, 132, 328.2, 525/293, 302

[56] References Cited

U.S. PATENT DOCUMENTS

| | | | |
|---|---|---|---|
| 5,068,286 | 11/1991 | Campbell et al. | 525/92 |
| 5,124,410 | 6/1992 | Campbell | 525/293 |
| 5,140,074 | 8/1992 | DeNicola, Jr. et al. | 525/263 |

*Primary Examiner*—James J. Seidleck
*Assistant Examiner*—Thomas Hamilton, III
*Attorney, Agent, or Firm*—William H. Pittman

[57] ABSTRACT

Graft copolymers are prepared by the reaction of an olefin polymer such as polyethylene or polypropylene with an ethylenically unsaturated t-alkylcarbamate compound. Said graft copolymers are capable of reaction with functionalized polyphenylene ethers to produce compatibilized polyphenylene ether-olefin polymer compositions.

20 Claims, No Drawings

FUNCTIONALIZED OLEFIN POLYMERS AND POLYPHENYLENE ETHER COMPOSITIONS CONTAINING THEM

FIELD OF THE INVENTION

This invention relates to the functionalization of olefin polymers, and more particularly to the preparation of functionalized olefin polymers under relatively mild conditions.

Blends of polymers derived from olefinically unsaturated monomers with other polymers frequently have advantageous properties as compared to the individual polymeric substituents. For example, polyphenylene ethers are known for their high temperature resistance, high melt viscosity and toughness. However, they are somewhat deficient for many uses in such properties as solvent resistance, impact strength and workability.

Such properties of polyphenylene ethers could be improved by blending them with olefin polymers such as polypropylene. It is generally required, however, that such blends contain relatively low proportions of olefin polymer, since in high proportions such polymers become incompatible with the polyphenylene ether and parts molded therefrom are brittle and may undergo delamination.

It is also known that blends of otherwise incompatible polymers may frequently be made compatible by incorporating therein a copolymer of the constituents of the blend. Polyphenylene ether-olefin polymer copolymers may be prepared, for example, by the reaction of epoxy- or carboxy-functionalized polyphenylene ethers with olefin polymers having grafted t-alkyl ester or t-alkyl carbamate units. Upon reaction with the functionalized polyphenylene ether at elevated temperatures, the t-alkyl ester or carbamate group is degraded by elimination of an olefin and (in the case of carbamate groups) carbon dioxide, leaving an amine or carboxylic acid group which undergoes reaction with the functionalized polyphenylene ether.

A problem with the previously disclosed functionalized olefin polymers is the relatively high temperatures required for their preparation. For example, the above-noted patent describes polypropylenes containing grafted t-butyl methacrylate and t-butyl allylcarbamate units, which require melt reaction conditions and temperatures of at least 175° C. for formation. Olefin polymers such as polypropylene degrade rapidly under such conditions, particularly in the presence of the required free radical initiators.

DESCRIPTION OF THE PRIOR ART

Blends of polyphenylene ethers and olefin polymers are disclosed, for example, in U.S. Pat. Nos. 4,166,055, 4,383,082 and 4,584,334. Compositions comprising copolymers of polyphenylene ethers and olefin polymers are disclosed in U.S. Pat. No. 5,124,410.

SUMMARY OF INVENTION

The present invention provides a class of olefin polymers having grafted t-alkyl-containing groups capable of facile degradation to provide amine or carboxylic acid functionalization, capable of reaction with functionalized polyphenylene ethers and other polymers. Said functionalized olefin polymers may be prepared at relatively low temperatures and under mild conditions, minimizing degradation.

In one of its aspects, the invention is a class of graft copolymers comprising molecules having a base olefin polymer chain and reactive grafted moieties comprising structural units of the formula

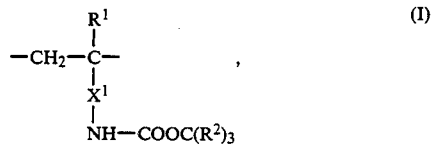

wherein each $R^1$ is independently hydrogen or $C_{1-5}$ alkyl, each $R^2$ is $C_{1-10}$ alkyl and $X^1$ is

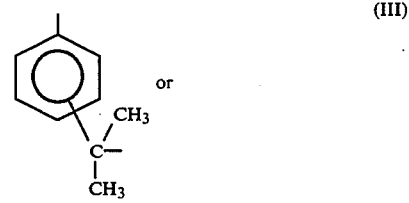

Another aspect of the invention is compositions prepared by the reaction of at least one graft copolymer as described hereinabove with at least one functionalized polyphenylene ether capable of reaction with said grafted moieties.

DESCRIPTION OF PREFERRED EMBODIMENTS

The base chains in the graft copolymers of this invention are conventionally derived from such monomers as ethylene, propylene, isobutene, 1-hexene and 1-octene. They may be homopolymers or copolymers, amorphous or crystalline. Polyethylene and polypropylene homopolymers, the former including high density, low density and linear low density polyethylene, are often preferred, with polypropylene being most preferred.

The grafted moieties comprise at least one, and frequently more than one, structural unit of formula I. If more than one structural unit is present, said moieties are grafted chains containing said units.

In formula I, $R^1$ may be hydrogen or a $C_{1-5}$ alkyl radical and is preferably hydrogen or methyl. Each $R^2$ is independently a ($C_{1-10}$ hydrocarbon radical with at least one $R^2$ being alkyl. Preferably, all $R^2$ radicals are alkyl, most often $C_{1-2}$ alkyl and most preferably methyl. The $X^1$ radical may have formula II, III or IV.

The structural units in the grafted moieties are illustrated by those derived from N-t-alkyloxycarbonyl-2-aminoethyl acrylates, {1-methyl-1-[3-(1-methylethenyl)phenyl]ethyl}carbamic acid t-alkyl or t-aralkyl esters and N-t-alkyloxycarbonyl-m,p-vinylbenzylamines. Most preferably, they are derived from N-t-butoxycarbonyl-2-aminoethyl acrylate, {1-methyl-1-[3-

(1-methylethenyl)phenyl]ethyl}carbamic acid t-butyl ester or N-t-butoxycarbonyl-m,p-vinylbenzylamine.

Said grafted units may also comprise other structural units, typically derived by addition polymerization from an alkenylaromatic monomer such as styrene. The use of styrene in the formation of the graft copolymer is frequently advantageous, as described hereinafter.

Carbamate-functionalized vinyl monomers suitable for producing the functionalized olefin copolymers can be prepared in a variety of ways. These are illustrated by the reaction of isocyanate-substituted vinyl monomers with tertiary alcohols, the reaction of amine-substituted vinyl monomers with di-t-alkyl dicarbonates to form carbamates and the reaction of aminoalkanols with di-t-alkyl dicarbonates to yield intermediates which then undergo reaction with (meth)acryloyl chloride.

The preparation of such carbamate-functionalized monomers is illustrated by the following examples.

EXAMPLE 1

A solution comprising 2-aminoethanol (183 g; 3.00 mol) and tetrahydrofuran (THF, 1 L) and a second solution comprising di-t-butyl dicarbonate (652 g, 2.98 mol) and THF (1 L) were pumped at room temperature and at equal rates (about 5.6 mL/min) into a 5 liter, three-necked flask containing THF (2 L). Over the course of 3 hr, gas evolution was observed and the temperature rose from 24° C. to 64° C. The reaction mixture was then concentrated on a rotary evaporator and vacuum dried for 1 hr at 150 millitorr. A light yellow oil was obtained. For identification purposes, a sample of the oil was purified via flash chromatography on 230–400 mesh silica using a 5/1 solution of hexanes to diethyl ether. The purified oil was identified by proton and carbon-13 nuclear magnetic resonance (NMR) spectroscopy as N-t-butoxycarbonyl-2-aminoethanol.

Crude N-t-butoxycarbonyl-2-aminoethanol (633 g) was diluted with THF (1 L). Likewise, acryloyl chloride (315 g, 3.48 mol) was added to enough THF to make a 1 liter solution. The two solutions were pumped at equal rates over a 2.5 hr period into a 5 L, three-necked flask containing THF (1.5 L) and pyridine (275 g, 3.48 mol). The reaction mixture exothermed over 2.5 hr, and was then cooled and concentrated on a rotary evaporator. The crude, yellow crystalline material which was obtained was purified by recrystallization at 0° C. using a solution of 5:1 hexanes to diethyl ether to yield a white crystalline solid (mp 54°–56° C.). Purification via flash chromatography using 230–400 mesh silica and a 10:1 solution of hexanes to diethyl ether gave N-t-butoxycarbonyl-2-aminoethyl acrylate, also as shown by proton and carbon-13 NMR spectroscopy.

EXAMPLE 2

Into a 3-neck, 10 L round bottom flask equipped with a mechanical stirrer, condenser, and a nitrogen inlet was placed α,α-dimethyl-m-isopropenylbenzyl isocyanate (1083 g, 5.38 mol), hexane (6 L), and t-butyl alcohol (398.8 g, 5.38 mol). While the mixture was stirred at room temperature, potassium t-butoxide (18.0 g, 160 mmol) was added in portions. Throughout the addition the reaction temperature increased to 50° C. The reaction was complete within an hour. The reaction mixture was washed with water (5 L), and thereafter, the organics were separated from the aqueous layer. The organics were dried over magnesium sulfate, filtered, and evaporated to yield a yellow-brown semi-solid. Recrystallization from hexane afforded essentially pure {1-methyl-1-[3-(1-methylethenyl)phenyl]ethyl}carbamic acid t-butyl ester (1193 g, 81% isolated yield), as shown by proton and carbon-13 NMR spectroscopy.

EXAMPLE 3

Into a 1 L round bottom flask were placed vinylbenzyl chloride (100 g, 655 mmol), dimethylformamide (500 mL), and sodium azide (42.6 g, 655 mmol). The mixture was stirred at room temperature for 24 hr. Diethyl ether (500 mL) was added and the mixture was extracted with water (300 mL). The organic layer was re-extracted with water (300 mL). The combined aqueous layers were extracted with ether (500 mL). The organic layers were combined, dried over magnesium sulfate, filtered, and evaporated to yield a light yellow oil (105 g, about 100% yield) identified as vinylbenzyl azide.

Into a 5 L, 3-neck round bottom flask equipped with a mechanical stirrer, condenser, and an addition funnel were placed lithium aluminum hydride (28.6 g, 754 mmol) and ether (2400 mL). This mixture was stirred at room temperature while a solution of the vinylbenzyl azide (79.2 g, 498 mmol) in ether (300 mL) was added dropwise. Gentle reflux was maintained after a slight induction period. The reaction was monitored by thin layer chromatography (ether:hexane 1:1). The reaction was over after about 4 hr. Water (150 mL) was carefully added followed by 1M sodium hydroxide (300 mL). The mixture was separated and the aqueous layer was extracted with ether (500 mL) twice. The combined organics were dried over magnesium sulfate, filtered, and evaporated to provide a light yellow oil (46.2, g, 70% yield) identified as a mixture of m- and p-vinylbenzylamine.

A solution of the vinylbenzylamine mixture (46.2 g, 347 mmol) in THF (200 mL) and a second solution of di-t-butyl dicarbonate (75.7 g, 347 mmol) in THF (200 mL) were pumped at equal rates (ca. 1.0 mL/min) at room temperature into a 5 L, 3-neck flask containing THF (400 mL). Over the course of 3 hr, gas evolution was observed. The reaction was concentrated on a rotary evaporator followed by vacuum drying at 150 millitorr for 1 hr. The resulting viscous material was columned on silica (230–400 mesh) with hexanes as the eluent to provide a light yellow oil identified as N-t-butoxycarbonyl-m,p-vinylbenzylamine (62.7 g, 77% isolated yield).

The graft copolymers of this invention may be prepared by the reaction, in an inert atmosphere such as nitrogen, of an olefin polymer with at least one monomer corresponding to the units of formulas I and II at a temperature in the range of about 60°–160° and preferably about 80°–135° C. (i.e., below the softening point of the olefin polymer), in the presence of a free radical initiator. The additional presence of a second liquid monomer such as styrene, substantially inert to reactions other than polymerization, is preferred, since it facilitates dispersion of the reactants in the olefin polymer and also is incorporated into the grafted moieties, which may suppress loss of functionality owing to steric crowding. Suitable free radical initiators will be readily apparent to those skilled in the art; they include such compounds as benzoyl peroxide, azobisisobutyronitrile and t-amylperoxy 2-ethylhexanoate.

The reaction may be conducted in solution, typically in a relatively high boiling solvent such as xylene or trichlorobenzene. However, reaction in solution is generally not preferred since such olefin polymers as polypropylene may dissolve in appreciable amounts only at a temperature at which degradation of the polymer is accelerated, which in the case of polypropylene is about 160° C. The reaction can also be conducted heterogeneously in a liquid which is a solvent for the monomer and initiator but a non-solvent for the polymer.

Both solution and non-solvent methods of preparation suffer from the disadvantage that the liquid reaction medium must be removed and either recycled or disposed of in further processing steps. Such processing steps may be avoided by treating the solid olefin polymer with monomer and initiator in accordance with the method described in U.S. Pat. No. 5,140,074, the disclosure of which is incorporated herein by reference.

It is frequently preferred for reasons of improved grafting efficiency to predisperse the monomer and initiator in the olefin polymer prior to initiating the reaction. Predispersion may be achieved by dissolving the monomer and initiator in a suitable liquid, which may be a chain transfer agent such as toluene or, preferably, the previously mentioned second liquid monomer, and blending the resulting solution with the olefin polymer before initiating the polymerization reaction by heating. If a non-reactive liquid such as toluene is employed for predispersion, it may be removed, typically by volatilization, before initiation of polymerization.

The proportion of monomer employed is subject to wide variation depending on the degree of functionalization desired. In general, about 0.5–5.0% is satisfactory. The proportions of initiator and liquid monomer are generally in the range of about 0.1–1.0% and 5–20% respectively. All of said percentages are based on olefin polymer.

The preparation of the graft copolymers of this invention is illustrated by the following examples. In each of said examples, the proportion of grafting monomer introduced into the polymer was shown by analysis to be in the range of about 70–85%. Percentages of materials other than olefin polymer are based on olefin polymer.

EXAMPLES 4–8

A 3-liter flask equipped with a thermometer, nitrogen inlet means, a stirrer and a rubber septum was charged with 400 grams of polypropylene powder and heated to 100° C. The contents of the flask were purged three times with nitrogen and the desired proportion of t-amylperoxy 2-ethylhexanoate was added through the septum over 2–5 minutes with a syringe, with vigorous stirring of the solid resin. Stirring was continued for about 2–5 additional minutes to disperse the initiator, after which a solution of the desired grafting monomer in styrene was sprayed onto the vigorously stirred powder at 2–2.5 ml. per minute. Heating and stirring were continued for 1 hour, after which the solid product was removed. Analysis was performed after extracting unreacted monomer overnight with hot methyl ethyl ketone in a Soxhlet extractor.

The graft copolymers prepared in this way are listed in Table I, in which TBA represents t-butyl acrylate.

TABLE I

| Example | % initiator | % styrene | Monomer Identity | % |
|---|---|---|---|---|
| 4 | 0.375 | 8 | Ex. 2 | 2 |
| 5 | 0.825 | 16 | Ex. 2 | 2 |
| 6 | 0.425 | 8 | TBA | 1 |
| 7 | 0.925 | 16 | TBA | 1 |

TABLE I-continued

| Example | % initiator | % styrene | Monomer Identity | % |
|---|---|---|---|---|
| 8 | 0.375 | 8 | Ex. 2 | 1 |

EXAMPLES 9–11

The procedure of Examples 4–8 was repeated, except that the initiator, styrene (8%) and grafting monomer (the product of Example 2) were predispersed in the polypropylene by dissolving in pentane, adding the pentane solution to the polypropylene and removing the pentane by vacuum stripping. The proportions of reactants employed are listed in Table II.

TABLE II

| Example | % initiator | % monomer |
|---|---|---|
| 9 | 0.41 | 0.5 |
| 10 | 0.48 | 1.0 |
| 11 | 0.40 | 2.0 |

The graft copolymers of this invention are useful in combination with functionalized polyphenylene ethers as summarized hereinabove. The resulting compatible compositions (hereinafter sometimes "polyphenylene ether compositions") are characterized by high impact strengths, tensile moduli and tensile elongations.

Polyphenylene ethers are known polymers comprising a plurality of structural units of the formula

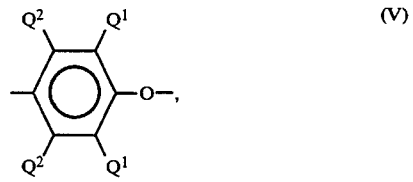

(V)

wherein in each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halo-hydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer polyphenylene ethers are included. The preferred homopolymers are those containing 2,6-dimethyl-1,4-phenylene ether units. Suitable copolymers include random copolymers containing such units in combination with (for example) 2,3,6-trimethyl-1,4-phenylene ether units. Also included are polyphenylene ethers containing moieties prepared by grafting onto the polyphenylene ether in known manner such materials as vinyl monomers or polymers such as polystyrenes and elastomers, as well as coupled polyphenylene ethers in which coupling agents such as low molecular weight polycarbonates, quinones, heterocycles and formals undergo reaction in known manner with the hydroxy groups of two polyphenylene ether chains to produce a higher molecular weight polymer, provided a substantial proportion of free OH groups remains.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The polyphenylene ethers are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful polyphenylene ethers for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the polyphenylene ethers contemplated for use in the present invention include all those presently known, irrespective of variations in structural units or ancillary chemical features.

To be effective in the formation of compatible compositions, the graft copolymers of this invention must undergo reaction with a suitable functionalized polyphenylene ether to form a further copolymer. Typically, a carboxy-functionalized polyphenylene ether, such as the fumaric acid-grafted materials disclosed in U.S. Pat. No. 4,888,397, is employed. Said patent is incorporated herein by reference.

The preparation of polyphenylene ether compositions may be effected by any method suitable for preparing an intimate blend at a temperature of at least about 125° C., preferably about 140°–250° C. While solution blending may be employed in some instances, melt blending operations are usually preferred. Conventional melt blending procedures and equipment may be employed, with extrusion often preferred because of its relative convenience and particular suitability. The result is elimination of an olefin and carbon dioxide as described hereinabove, to form at least one amine group on the graft copolymer which can then undergo reaction with the functionalized polyphenylene ether.

Those skilled in the art will be familiar with blending methods and apparatus capable of intimately blending resinous constituents, especially by kneading. They are exemplified by disc-pack processors and various types of extrusion equipment. Illustrations of the latter are continuous mixers; single screw kneading extruders; corotating, intermeshing and counterrotating, non-intermeshing twin screw extruders having such features as staggered configuration screws, forward-flighted compounders, cylindrical bushings and left-handed screw elements; and extruders having screws which include at least one and preferably two or more kneading block elements.

It is also contemplated to incorporate in the polyphenylene ether composition impact modifiers compatible with either or both of the polyphenylene ether and the graft copolymer.

Impact modifiers for polyphenylene ethers include natural and synthetic elastomeric polymers, typically derived from such monomers as olefins (e.g., ethylene, propylene, 1-butene and 4-methyl-1-pentene), alkenylaromatic monomers (e.g., styrene and α-methylstyrene), conjugated dienes (e.g., butadiene, isoprene and chloroprene), and vinylic carboxylic acids and their derivatives (e.g., vinyl acetate, acrylic acid, alkylacrylic acids, ethyl acrylate, methyl methacrylate and acrylonitrile). They include homopolymers and random, block, radial block, graft and core-shell copolymers as well as combinations thereof.

Suitable olefin homopolymers include low density, linear low density and high density polyethylene, isotactic polypropylene and the like. Conjugated diene polymers include homopolymers and random copolymers such as polybutadiene, butadiene-styrene copolymers, isoprene-isobutene copolymers, chlorobutadiene polymers, butadiene-acrylonitrile copolymers and polyisoprene. Ethylene-propylene-diene monomer rubbers, comprising predominantly ethylene units, a moderate proportion of propylene units and up to about 20 mole percent of non-conjugated diene monomer units, are also suitable.

A particularly useful class of impact modifiers comprises the AB (diblock) and ABA (triblock) copolymers and core-shell graft copolymers of alkenylaromatic and diene compounds, especially those comprising styrene and butadiene or isoprene blocks. The conjugated diene blocks may be partially or entirely hydrogenated, whereupon they may be represented as ethylene-propylene blocks or the like and have properties similar to those of olefin block copolymers. Examples of triblock copolymers of this type are polystyrene-polybutadiene-polystyrene (SBS), hydrogenated polystyrene-polybutadiene-polystyrene (SEBS), polystyrene-polyisoprene-polystyrene (SIS), poly(α-methylstyrene)-polybutadiene-poly(a-methylstyrene) and poly(a-methylstyrene)-polyisoprene-poly(a-methylstyrene). Particularly preferred triblock copolymers are available commercially as CARIFLEX ®, KRATON D ® and KRATON G ® from Shell.

Also suitable as impact modifiers are the ionomer resins, which may be wholly or partially neutralized with metal ions, and the core-shell type graft copolymers. In general, the latter have a predominantly conjugated diene or crosslinked acrylate rubbery core and one or more shells polymerized thereon and derived from monoalkenylaromatic and/or acrylic monomers alone or in combination with other vinyl monomers. Included are copolymers wherein an interpenetrating network of the resins employed characterizes the interface between the core and shell, such as those available from General Electric Company and described in U.S. Pat. No. 3,944,631.

Other impact modifiers include the above-described types containing units having polar groups or active functional groups, as well as miscellaneous polymers such as Thiokol rubber, polysulfide rubber, polyurethane rubber, polyether rubber (e.g., polypropylene oxide), epichlorohydrin rubber, ethylene-propylene rubber, thermoplastic polyester elastomers and thermoplastic ether-ester elastomers.

The polyphenylene ether compositions of this invention may also contain conventional ingredients such as fillers, flame retardants, pigments, dyes, stabilizers, antistatic agents, crystallization aids, mold release agents and the like, as well as resinous components not previously discussed.

The proportions of polyphenylene ether, graft copolymer and other resinous materials such as impact modifier (if present) are not critical; they may be widely varied to provide compositions having the desired properties. Most often, the polyphenylene ether is employed in an amount in the range of about 5–95%, preferably about 15–70%, of the composition by weight. Impact modifiers are usually present in the amount of about 1–50 parts per 100 parts of polyphenylene ether.

The preparation of polyphenylene ether compositions of this invention is illustrated by the following examples.

EXAMPLE 12–16

The functionalized polyphenylene ether employed was a commercially available poly(2,6-dimethyl-1,4-phenylene ether) having an intrinsic viscosity of about 0.46 dl./g., as determined in chloroform at 25° C. It was provided with epoxide functionality by reaction with 2-chloro-4-glycidoxy-6-mesitoxytriazine in an amount to provide 1.4% epoxy groups by weight.

Dry blends of 30 parts by weight of the functionalized polyphenylene ether, 50 parts of various graft copolymers of the invention and 5 parts of a commercially available styrene-butadiene-styrene triblock copolymer were extruded on a twin screw extruder at 150° C. The extrudates were molded into test specimens and tested for tensile and impact properties by standard ASTM test methods.

The relative parameters and test results are given in Table III, in comparison with a control in which a non-functionalized polypropylene was employed.

TABLE III

|  | Example |  |  |  |  | Control |
|---|---|---|---|---|---|---|
|  | 12 | 13 | 14 | 15 | 16 | |
| Graft copolymer | Ex. 4 | Ex. 8 | Ex. 9 | Ex. 10 | Ex. 11 | — |
| Notched Izod impact strength, joules/m. | 85 | 80 | 91 | 80 | 69 | 69 |
| Tensile modulus, GPa. | 3.45 | 3.79 | 4.00 | 3.79 | 3.93 | 3.51 |
| Tensile elongation, % | 260 | 200 | 260 | 350 | 176 | 146 |

It will be apparent from Table III that the polyphenylene ether compositions of this invention are comparable to compositions prepared from non-functionalized olefin polymers in impact strength and tensile modulus, and substantially superior in tensile elongation.

What is claimed is:

1. A graft copolymer comprising molecules having a base olefin polymer chain and reactive grafted moieties comprising structural units of the formula

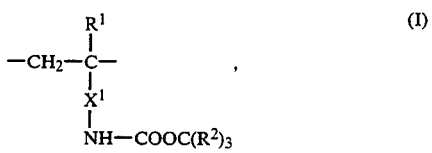

wherein each $R^1$ is independently hydrogen or $C_{1-5}$ alkyl, each $R^2$ is $C_{1-10}$ alkyl and $X^1$ is

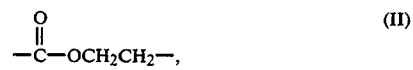

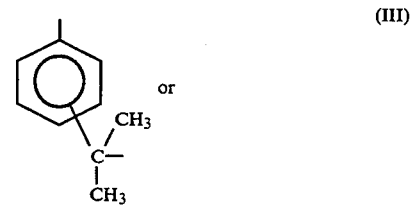

2. A copolymer according to claim 1 wherein the olefin polymer is polyethylene or polypropylene.
3. A copolymer according to claim 2 wherein $R^1$ is hydrogen or methyl.
4. A copolymer according to claim 3 wherein each $R^2$ is methyl.
5. A copolymer according to claim 2 wherein the grafted moieties also comprise structural units derived by addition polymerization from an alkenylaromatic monomer.
6. A copolymer according to claim 5 wherein the alkenylaromatic monomer is styrene.
7. A copolymer according to claim 6 wherein the olefin polymer is polypropylene.
8. A copolymer according to claim 6 wherein $X^1$ has formula III.
9. A copolymer according to claim 8 wherein $R^1$ is hydrogen and each $R^2$ is methyl.
10. A copolymer according to claim 6 wherein $X^1$ has formula IV.
11. A copolymer according to claim 10 wherein $R^1$ is hydrogen and each $R^2$ is methyl.
12. A copolymer according to claim 6 wherein $X^1$ has formula V.
13. A copolymer according to claim 6 wherein $R^1$ is hydrogen and each $R^2$ is methyl.
14. A composition prepared by the reaction of at least one graft copolymer according to claim 1 with at least one functionalized polyphenylene ether capable of reaction with the grafted moieties in said graft copolymer.
15. A composition according to claim 14 wherein the polyphenylene ether is a poly(2,6-dimethyl-1,4-phenylene ether).
16. A composition according to claim 15 wherein the polyphenylene ether is carboxy-functionalized.
17. A composition according to claim 16 wherein the olefin polymer is polypropylene.
18. A composition according to claim 17 wherein $X^1$ has formula III.
19. A composition according to claim 17 wherein $X^1$ has formula IV.
20. A composition according to claim 17 wherein $X^1$ has formula V.

* * * * *